United States Patent [19]
Moister, Jr.

[11] 3,723,858
[45] Mar. 27, 1973

[54] METHOD FOR TESTING HERMETICALLY ENCLOSED, ELECTRICAL SWITCHING DEVICES FOR LEAKS

[75] Inventor: Douglas E. Moister, Jr., Plymouth, Mich.

[73] Assignee: Burroughs Corporation, Detroit, Mich.

[22] Filed: Dec. 20, 1971

[21] Appl. No.: 209,536

[52] U.S. Cl. ............................. 324/28 RS, 324/33
[51] Int. Cl. .................. G01r 31/02, G01n 27/62
[58] Field of Search ...... 324/28, 33, 34 RS; 73/40, 52

[56] References Cited

UNITED STATES PATENTS 3,252,083  5/1966  Wagar ........................... 324/28 RS
3,277,558  10/1966  Shaffer ....................... 324/28 RS UX
3,510,760  5/1970  Hellstrom ........................ 324/28 R

OTHER PUBLICATIONS

Fennell, T. R. Voltage Breakdown Testing Technique, IBM Technical Disclosure Bulletin Vol. 8 No. 10 March 1966 P. 1321.

Primary Examiner—Gerard R. Strecker
Attorney—Paul W. Fish et al.

[57] ABSTRACT

A method is provided for testing hermetically enclosed, electrical switching devices for gas leaks wherein current flowing through a resistor and the contacts of a device under test is measured with the contacts closed and again after the contacts have been opened, the sole potential applied across the series circuit being of sufficient amplitude to ionize the gas between the opening contacts, the ratio of the two current measurements reflecting the gas content of the device under test.

5 Claims, 1 Drawing Figure

Patented March 27, 1973 3,723,858
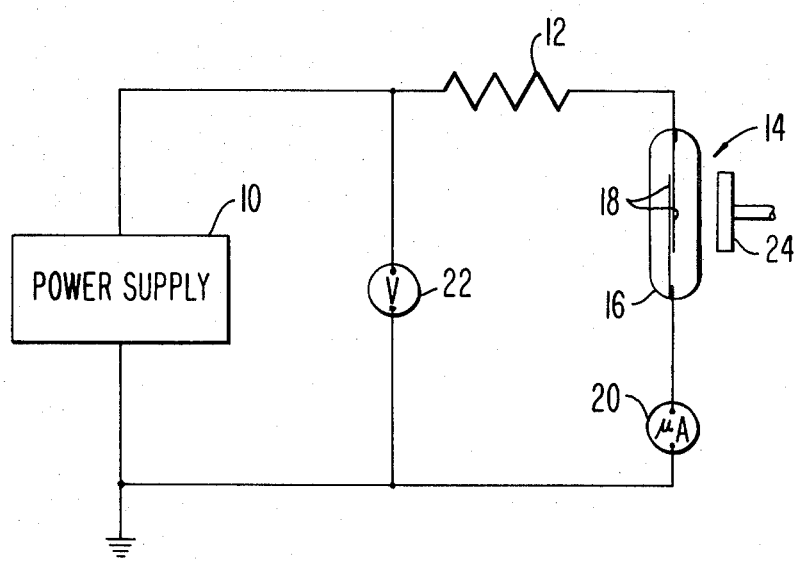
INVENTOR.
DOUGLAS E. MOISTER, JR.

METHOD FOR TESTING HERMETICALLY ENCLOSED, ELECTRICAL SWITCHING DEVICES FOR LEAKS

BACKGROUND OF THE INVENTION

The invention relates to methods for testing sealed, electrical switches in general and more particularly for testing hermetically enclosed, reed-type switches for gas leaks.

Prior art discloses methods for testing sealed, electrical switch enclosures by applying an electrical potential across contacts disposed therein and observing the amount of current, if any, flowing between the contacts, the current being carried by gas ionized by the applied potential, the quantity of current flowing being related to the gas content of the switch enclosure. Methods such as this require a potential having sufficient amplitude to ionize the gas between the contacts, the amplitude required being a function of several factors, one of which is the distance between the contacts. Typical examples in the prior art require potentials normally in excess of 1,500 volts. Once the gas in the device being tested has been ionized, this potential is then usually reduced to about one half of this value, during which time a test for current flow through the ionized gas between the contacts is performed. This example has the obvious disadvantages of requiring a power supply, with its inherent expense and hazards, capable or producing a rather high voltage and also of requiring a control means, with its inherent expense, capable of increasing and decreasing the amplitude of the potential applied to a device under test at the proper time. Another disadvantage is the inability of such examples to indicate very small quantities of foreign gas within enclosures under test.

SUMMARY OF THE INVENTION

The invention resides in the provision of a method for testing hermetically enclosed, electrical switching devices for gas leaks by measuring current flowing through ionized gas between contacts thereof, the method utilizing the action of the contacts of a device under test so that only one, relatively low potential for ionizing the gas and sustaining the current flow therethrough is required.

Accordingly it is an object of the present invention to provide a method for testing hermetically enclosed, electrical switching devices for gas leaks, the method requiring a power supply capable of providing only a relatively low electrical potential, thereby keeping attendant cost and hazards at a minimum.

It is another object of the invention to provide a method which does not require a complex and expensive control means for changing the amplitude of the electrical potential applied to the contacts of a device under test, only one amplitude being required.

It is yet another object of the invention to provide a method which will detect a rather small amount of foreign air inside the contact enclosure of a device under test, thereby enabling the testing of such devices for extremely slight leaks immediately after the device's manufacture.

An important aspect of the invention is the utilization of the action of the contacts of a device under test to reduce the amplitude of electrical potential required to ionize gas residing therebetween by reducing the initial spacing of the contacts.

BRIEF DESCRIPTION OF THE DRAWING

These and other objects, aspects and advantages of the invention will be more clearly understood from the following description when read in conjunction with the accompanying drawing, in which:

The FIGURE is an electrical schematic representation, partially in block diagram form, of a test circuit embodying features embraced by the invention.

DETAILED DESCRIPTION OF THE INVENTION

The electrical schematic shown by the figure has a power supply 10, having a potential output of approximately 525 volts DC, and an electrical resistor 12, having a resistance of approximately 85 megohms. Also shown is a magnetically actuatable reed switch, generally indicated at 14, which is disposed in the circuit in a typical manner for a test of its hermetically sealed contact enclosure 16. The contacts 18—18, are connected in series with the resistor 12 and also with a microammeter 20. This series circuit is connected across the power supply 10, as is also a voltmeter 22. A magnet 24 is shown disposed adjacent the contact enclosure 16, the magnet being retractably movable toward the enclosure to bring the contacts 18—18 therein under the effective influence of the field of the magnet.

OPERATION OF THE INVENTION

A device, in this case a magnetically actuatable reed switch generally indicated at 14, to be tested according to the method of this invention would be connected as shown by the figure with its contacts 18—18 in series with the electrical resistor 12 and with the microammeter 20, this series circuit being connected across the power supply 10. When the power supply is first energized, its output voltage will be indicated by the voltmeter 22. Although the contact enclosure 16 contains some gas, no current flow will be indicated by the microammeter 20 since the contacts 18—18 are separated. Moving the magnet 24 to a position nearer the contact enclosure 16 will cause the contacts to close under the influence of the magnet's field. With the contacts closed, current will now flow therethrough, the amount of current flowing being indicated by the microammeter 20. With the elements of the embodiment shown and using the resistor 12, which has a resistance of 85 megohms, the current flow indicated will be approximately 5 microamperes.

Proceeding with the test, the magnet 24 is next moved away from the contact enclosure 16, freeing the contacts 18—18 therein from the influence of the magnet's field and permitting them to separate once again. Since, as the contacts separate, the initial distance therebetween is very small, the relatively low potential of 525 volts will be adequate to ionize the gas between them. Once ionization has occurred, this potential will also be adequate to sustain the ionization current as the contacts continue to move apart to their respective rest positions. With a typical, non-defective reed switch, the electrical resistance offered to the current flowing through the ionized gas is approximately equal to that of the resistor 12, that is, 85 megohms. The resulting current flow indicated should be on the order of 3 microamperes. Such a drop of the current flowing through the circuit from approximately 5 microamperes with the contacts 18—18 closed to approximately 3 microamperes after the contacts have been opened indicates the interior environmental integrity of the contact enclosure 16 has not been breached, that is, no more than the proper amount of gas is present.

If the current flowing through the circuit drops from 5 microamperes to zero when the contacts 18—18 are opened, this condition indicates the contact enclosure 16 is not hermetically intact, that a sufficient quantity of air has leaked into the enclosure to prevent ionization. If the current flowing through the circuit after the contacts have been opened fluctuates, this condition also indicates the contact enclosure is not hermetically intact and that just enough air has leaked into the enclosure to support an electrical arc between the contacts thereof. This latter aspect of the invention finds application in the ability to expose very slight leaks in enclosures being tested immediately following their manufacture and before a substantial quantity of air has an opportunity to enter.

While the method for testing hermetically enclosed, electrical switching devices for leaks has been shown and described in considerable detail, it should be understood that many changes and variations may be made therein without departing from the spirit and scope of the invention.

What is claimed is:

1. A method for testing hermetically enclosed, electrical switching devices for gas leaks comprising the steps of:

connecting the contacts of a device under test and an electrical resistor in series;

connecting an electrical power supply having a voltage output sufficient to ionize the gas between opening contacts of the device under test across the series circuit of the resistor and the device under test;

closing the contacts of the device under test;

measuring the current flowing through the series circuit;

opening the contacts of the device under test, thereby ionizing the gas therebetween; and again measuring the current flowing through the series circuit, the ratio of the measured current flowing through the series circuit with the contacts closed to the measured current flowing through the series circuit with the contacts open reflecting the gas content of the device under test.

2. A method for testing hermetically enclosed, electrical switching devices for gas leaks as defined by claim 1 wherein the electrical resistance of the resistor and the electrical resistance of the opened contacts of the device under test when gas therebetween is ionized is substantially equal.

3. A method for testing hermetically enclosed, electrical switching devices for gas leaks as defined by claim 2 wherein a drop to zero in the current flowing through the series circuit is a manifestation of a substantial quantity of air having leaked into the device under test, ionization of gas between the opened contacts thereof being prevented thereby.

4. A method for testing hermetically enclosed, electrical switching devices for gas leaks as defined by claim 3 wherein a fluctuating current flowing through the series circuit with the contacts open is a manifestation of a sufficient quantity of air having leaked into the device under test to support an electrical arc between the contacts thereof.

5. A method for testing hermetically enclosed, electrical switching devices for gas leaks as defined by claim 4 wherein a reduction in the measured current flowing through the series circuit with the contacts open to approximately one half of that flowing through the series circuit with the contacts closed is a manifestation of sustained interior environmental integrity of the device under test.

* * * * *